United States Patent
Weed

(10) Patent No.: US 9,728,290 B2
(45) Date of Patent: Aug. 8, 2017

(54) ENERGY SHIELD FOR RADIATION SYSTEM

(71) Applicant: ANALOGIC CORPORATION, Peabody, MA (US)

(72) Inventor: Steven Weed, Peabody, MA (US)

(73) Assignee: Analogic Corporation, Peabody, MA (US)

( * ) Notice: Subject to any disclaimer, the term of this patent is extended or adjusted under 35 U.S.C. 154(b) by 88 days.

(21) Appl. No.: 14/433,159

(22) PCT Filed: Oct. 2, 2012

(86) PCT No.: PCT/US2012/058447
§ 371 (c)(1),
(2) Date: Apr. 2, 2015

(87) PCT Pub. No.: WO2014/055067
PCT Pub. Date: Apr. 10, 2014

(65) Prior Publication Data
US 2015/0262720 A1 Sep. 17, 2015

(51) Int. Cl.
*G21F 3/00* (2006.01)
*G01V 5/00* (2006.01)

(52) U.S. Cl.
CPC .............. *G21F 3/00* (2013.01); *G01V 5/0016* (2013.01)

(58) Field of Classification Search
USPC ........................ 250/505.1, 515.1, 519.1, 526
See application file for complete search history.

(56) References Cited

U.S. PATENT DOCUMENTS

| | | | |
|---|---|---|---|
| 3,967,129 A | 6/1976 | Winkler | |
| 4,581,538 A * | 4/1986 | Lenhart | G21F 3/00 250/515.1 |
| 5,814,825 A * | 9/1998 | Mussman | G21F 3/00 250/506.1 |

(Continued)

FOREIGN PATENT DOCUMENTS

| | | |
|---|---|---|
| DE | 4301908 A1 | 8/1994 |
| DE | 102010025831 A1 | 1/2012 |

OTHER PUBLICATIONS

First Chinese Office Action cited in Chinese Application No. 201280077456.7 dated Jun. 29, 2016, 13 pgs.

(Continued)

*Primary Examiner* — Bernard Souw
(74) *Attorney, Agent, or Firm* — Cooper Legal Group, LLC

(57) ABSTRACT

Among other things, an energy shield (212) for a radiation system, such as a security imaging system, is provided. The energy shield is comprised of one or more flaps (300). At least one flap defines an aperture (320) providing a demarcation between a first flap segment (322) of the flap and a second flap segment (324) of the flap. The aperture (e.g., and a flexible member (326) positioned spatially proximate the aperture) provide for (e.g., facilitate) movement of the second flap segment relative to the first flap segment. In this manner, an amount of force required to be applied by an object to pass by the flap may be reduced when the object is small and merely contacts the second flap segment, for example. In this manner, baggage jams may be mitigated, for example, by reducing the likelihood that certain objects will be impeded from passing through the energy shield.

20 Claims, 4 Drawing Sheets

(56) References Cited

U.S. PATENT DOCUMENTS

| | | | | |
|---|---|---|---|---|
| 7,188,625 | B2* | 3/2007 | Durette | A61F 9/04 |
| | | | | 128/858 |
| 7,767,990 | B2* | 8/2010 | Cadwalader | A61B 6/107 |
| | | | | 128/846 |
| 9,014,331 | B2* | 4/2015 | Crass | G21F 1/10 |
| | | | | 378/57 |
| 2008/0025470 | A1 | 1/2008 | Streyl | |
| 2008/0164425 | A1* | 7/2008 | Cadwalader | A61B 6/107 |
| | | | | 250/492.1 |
| 2013/0114788 | A1* | 5/2013 | Crass | G21F 1/10 |
| | | | | 378/57 |
| 2016/0038103 | A1* | 2/2016 | Cadwalader | A61B 6/107 |
| | | | | 250/515.1 |
| 2016/0158082 | A1* | 6/2016 | Gainor | A61B 6/503 |
| | | | | 5/690 |

OTHER PUBLICATIONS

EP Office Action cited in EP Application No. 12787180.4 dated Jan. 28, 2016, 4 pgs.
Reply EP Office Action cited in EP Application No. 12787180.4 dated May 24, 2016, 4 pgs.
International Search Report cited in related application No. PCT/US12/58447 dated Apr. 16, 2013, pp. 13.
Second Chinese Office Action cited in Chinese Application No. 201280077456.7 dated Feb. 22, 2017, 9 pgs.

\* cited by examiner

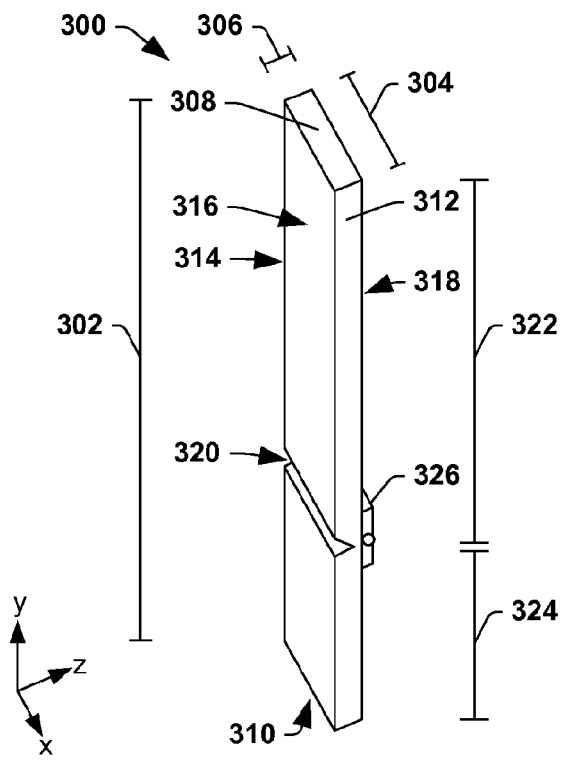
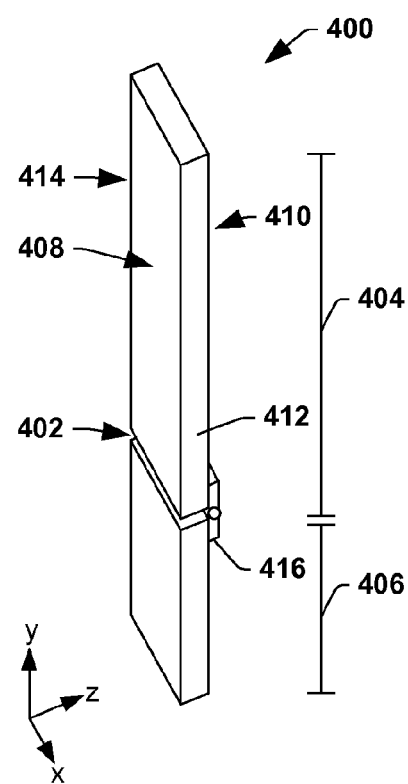
FIG. 3  FIG. 4
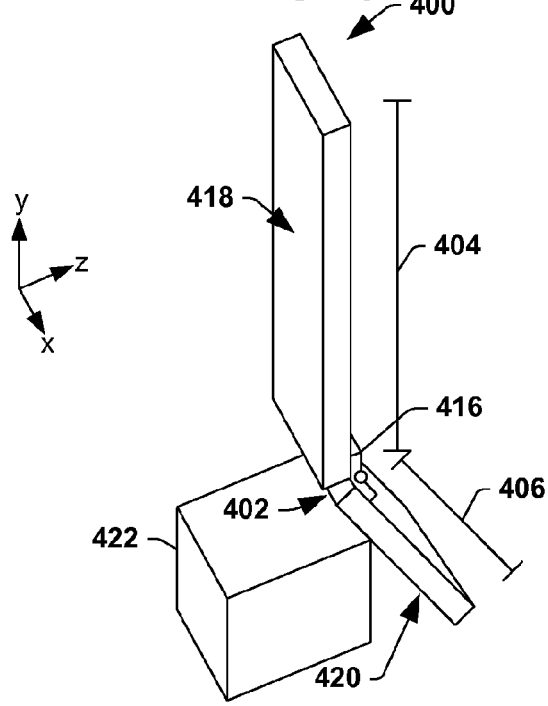
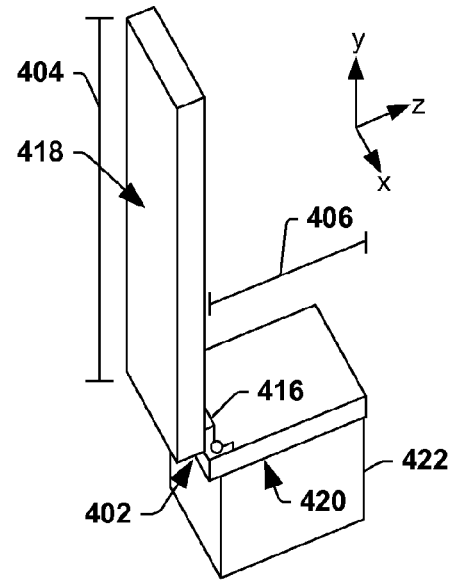
FIG. 5  FIG. 6

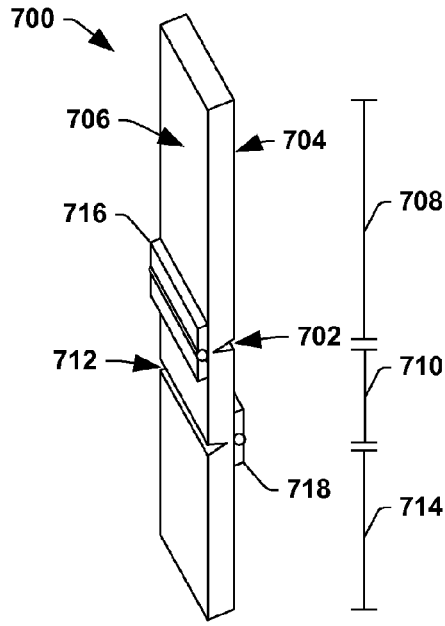
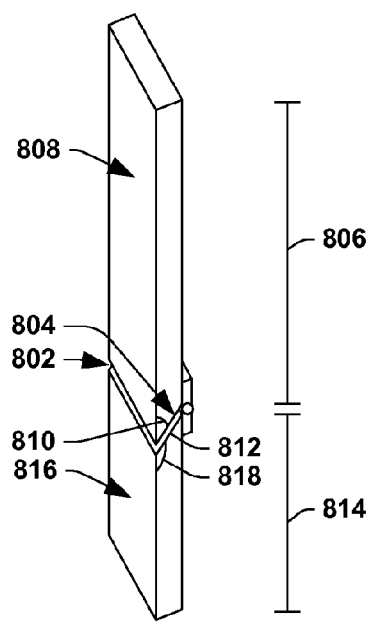
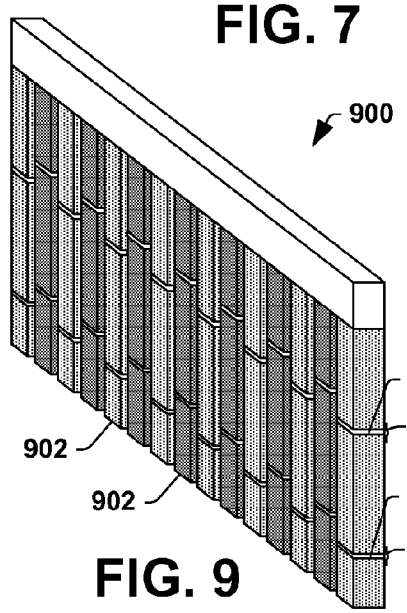
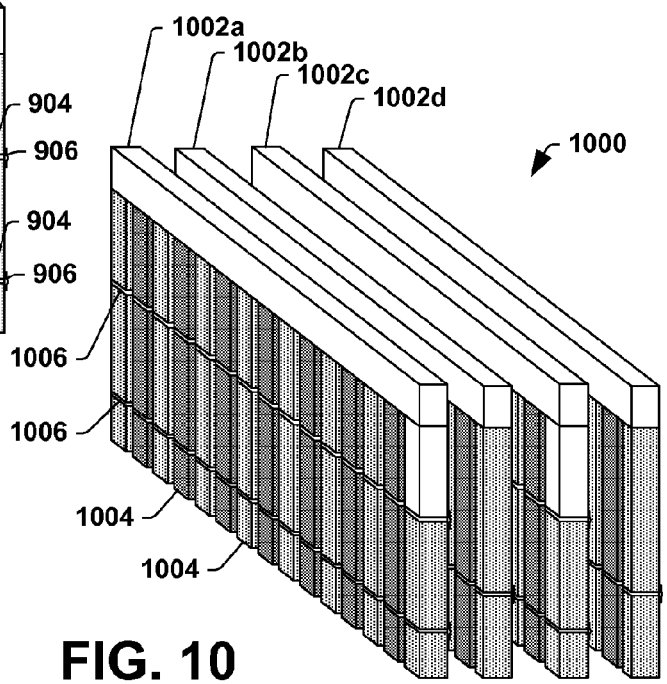
FIG. 7
FIG. 8
FIG. 9
FIG. 10

ENERGY SHIELD FOR RADIATION SYSTEM

BACKGROUND

The present application relates to an energy shield for a radiation system. It finds particular application in the context of security imaging, where an energy shield (e.g., a lead curtain) is positioned in an entryway and/or exit of the radiation system. However, it may also find applicability in medical fields and/or industrial fields, where radiation systems employing radiation technology are configured to examine/image an object.

Today, radiation systems (e.g., also referred to herein as imaging systems) such as computed tomography (CT) systems, single-photon emission computed tomography (SPECT) systems, projection systems, and/or line systems, for example, are useful to provide information, or images, of interior aspects of an object under examination. Generally, the object is exposed to radiation comprising photons (e.g., such as x-rays, gamma rays, etc.), and an image(s) is formed based upon the radiation absorbed and/or attenuated by interior aspects of the object, or rather an amount of photons that is able to pass through the object. Generally, highly dense aspects of the object absorb and/or attenuate more radiation than less dense aspects, and thus an aspect having a higher density, such as a bone or metal, for example, may be apparent when surrounded by less dense aspects, such as muscle or clothing.

In some radiation systems, such as systems commonly found at security checkpoints, an energy shield, such as a lead curtain, is placed at an entrance to the radiation system and/or at an exit from the radiation system. Such a shield is configured to mitigate radiation leakage to an environment external to the radiation system. Typically, such an energy shield is comprised of a plurality of flaps, and the force of an object (e.g., such as a suitcase) being guided into or out of the radiation system (e.g., via a conveyor belt) causes flaps that contact the object to move, permitting the object to enter the radiation system and be exposed to radiation and/or permitting the object to exit the radiation system.

It may be appreciated that the force required to move one or more flaps may be considerable given that the flaps are constructed of a radiation attenuating material, such as lead, and may be two or more feet in length, and thus may have a fair amount of inertia to overcome. As such, the movement of relatively light objects and/or small objects into and/or out of the radiation system may be hampered by the flaps. For example, the flaps may resist movement and cause light objects and/or small objects to be rotated, flipped, and/or pushed against other objects entering and/or exiting the radiation system. In this way, objects may become jammed within the radiation system, forcing the radiation system be to shut down while the jam is addressed, for example.

SUMMARY

Aspects of the present application address the above matters, and others. According to one aspect, an apparatus is provided. The apparatus comprises an energy shield configured to mitigate radiation leakage from a radiation system. The energy shield comprises one or more flaps. A first flap of the one or more flaps defines a first aperture providing a first demarcation between a first flap segment of the first flap and a second flap segment of the first flap. The first aperture also provides for movement of the second flap segment relative to the first flap segment.

According to another aspect, an apparatus is provided. The apparatus comprises an energy shield configured to mitigate radiation leakage from a radiation system. The energy shield comprises one or more flaps, a first flap of the one or more flaps defines an aperture extending through the first flap from a first face of the first flap to a second face of the first flap that is opposite the first face. The aperture provides a first demarcation between a first flap segment of the first flap and a second flap segment of the first flap. The first flap comprises a flexible member configured to physically couple the first flap segment to the second flap segment and to provide for movement of the second flap segment relative to the first flap segment.

According to another aspect, a radiation system is provided. The radiation system comprises a radiation source, a detector array, and an examination region through which radiation passes. The imaging system further comprises an energy shield configured to mitigate radiation leakage from the examination region through an opening in the radiation system through which an object is conveyed at least one of into or out of the examination region. The energy shield is positioned within the opening and comprises one or more flaps. A first flap of the one or more flaps defines an aperture providing for movement of a second flap segment of the first flap relative to a first flap segment of the first flap.

Those of ordinary skill in the art may appreciate still other aspects of the present application upon reading and understanding the appended description.

FIGURES

The application is illustrated by way of example and not limitation in the figures of the accompanying drawings, in which like references generally indicate like elements and in which:

FIG. 3 illustrates an example flap of an energy shield.

FIG. 4 illustrates an example flap of an energy shield.

FIG. 5 illustrates how a second flap segment of a flap may move relative to a first flap segment.

FIG. 6 illustrates how a second flap segment of a flap may move relative to a first flap segment.

FIG. 7 illustrates an example flap of an energy shield.

FIG. 8 illustrates an example flap of an energy shield.

FIG. 9 illustrates an example energy shield comprising a layer of flaps.

FIG. 10 illustrates an example energy shield comprising multiple layers of flaps.

DESCRIPTION

Figure 1:
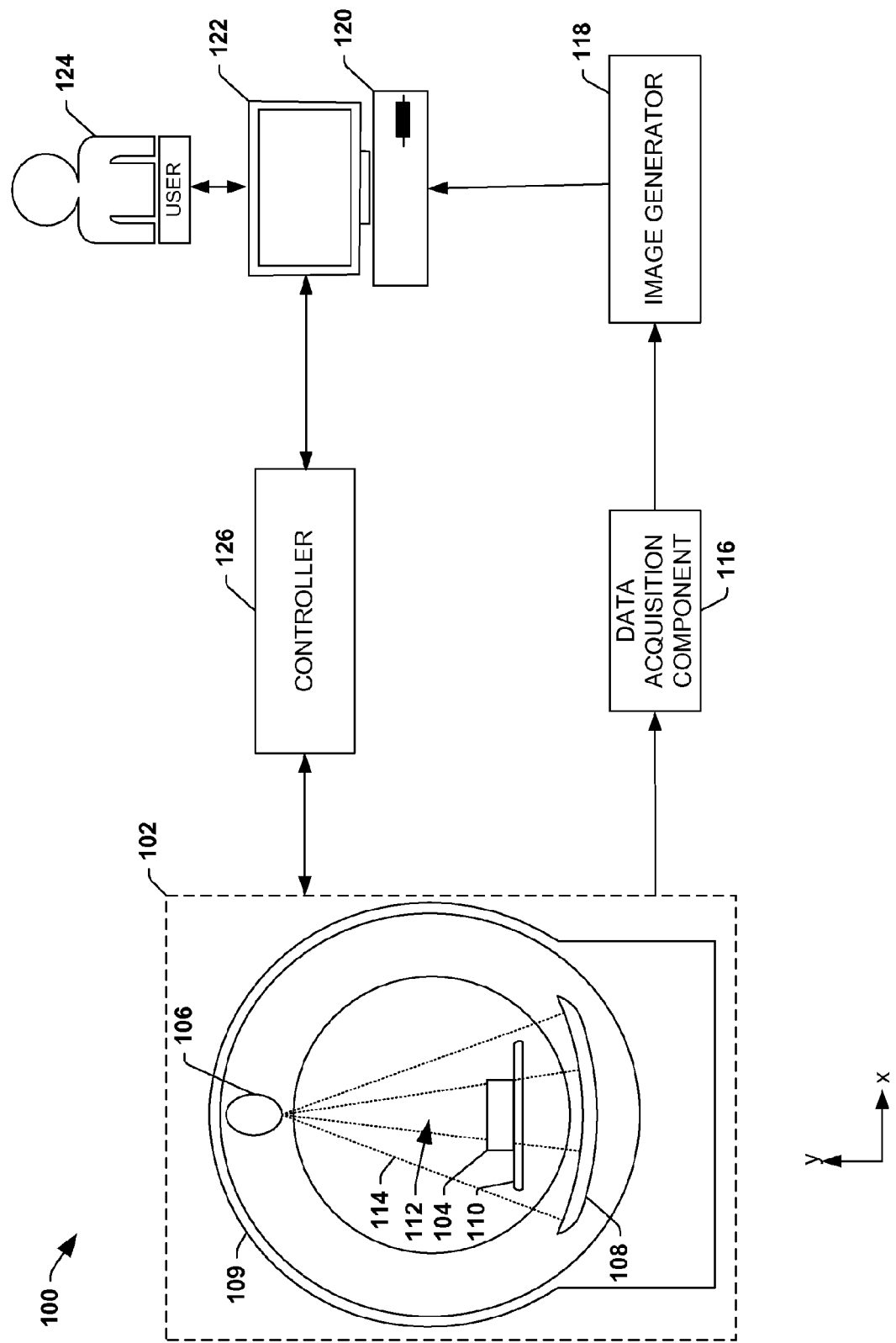
FIG. 1 is a schematic block diagram illustrating an example environment where an energy shield such as described herein may be implemented.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

The present disclosure relates to an energy shield for a radiation system, such as a security imaging system, for example. The energy shield is configured to mitigate radiation leakage at an entryway into the radiation system (e.g., or into an examination region of the radiation system) and/or at an exit of the radiation system (e.g., or at an exit of the examination region). The energy shield comprises of one or more flaps. At least some of the flaps respectively define an aperture which provides a demarcation between a first flap segment of respective flaps and a second flap segment of respective flaps. The aperture (e.g., which may be a notch in the flap, a slice through the flap, etc.) provides for movement (e.g., pivoting, hinging, etc.) of the second flap segment relative to the first flap segment. In this way, the aperture may serve as a flex-point in the flap to provide for substantially independent movement of a first portion of the flap relative to another portion(s) of the flap, for example.

A flexible member may be coupled to the flap at a location spatially proximate the aperture to reinforce the demarcation (e.g., in the case of a notch) and/or to physically couple the first flap segment to the second flap segment (e.g., in the case of a slice through the flap). The flexible member (e.g., a mechanical hinge, fiber reinforced tape, etc.) may be further configured to provide for movement of the second flap segment relative to the first flap segment.

Movement of the second flap segment relative to the first flap segment may reduce an amount of force required (e.g., by relatively small objects) to gain entry into the radiation system (e.g., or into the examination region) and/or to exit the radiation system. For example, when an object contacts merely the second flap segment of a flap (e.g., as opposed to both the first flap segment and the second flap segment), an amount of force needed to gain entry/exit may be approximate to an amount of force needed to move the second flap segment (e.g., as opposed to the amount of force needed to move the entire flap, which includes at least the first flap segment and the second flap segment). That is, stated differently, by dividing the flap into segments (e.g., respectively configured for movement substantially independently of the other flap segments), an amount of force needed to gain entry/exit may be reduced relative to an amount of force that would otherwise be needed in the absence of such independently moveable segments, for example. In this way, the aperture and/or flexible member may facilitate a reduction in bag jams, particularly with regard to smaller objects that may exert less force and/or objects oriented in a manner that makes it difficult for the objects to displace non-segmented flaps, for example.

FIG. 1 illustrates an example environment 100 of a radiation system where an energy shield, such as a lead curtain, may be useful. Examples of radiation systems where an energy shield may be useful include, but are not limited to, computed tomography (CT) systems, single-photon emission computed tomography (SPECT) systems, digital projection systems, and/or line systems, for example. It may be appreciated that the environment 100 is merely an example and is not intended to be interpreted in a limiting manner, such as necessarily specifying the location, inclusion, and/or relative arrangement of the components depicted therein. By way of example, a data acquisition component 116 as illustrated in FIG. 1 may be part of a detector array 108, for example.

In the example environment 100, an object examination apparatus 102 of the radiation system is configured to examine one or more objects 104 (e.g., a series of suitcases at an airport, a human patient, etc.). A cross-section of the examination apparatus 102 is illustrated and comprises one or more radiation sources 106 (e.g., an x-ray source, gamma-ray source, or other ionizing radiation source) and a detector array 108 mounted on diametrically opposite side of the object examination apparatus 102 relative to the radiation source(s) 106. A support article 110 is configured to support the object(s) 104 and/or convey the object(s) 104 into an examination region 112 (e.g., a hollow bore in the radiation system through which radiation 114 travels). The radiation source(s) 106, detector array 108, and/or examination region 112 may be substantially enclosed by a housing 109.

During an examination, the object(s) 104 is conveyed or translated through the examination region 112 via the support article 110, which may comprise a bed or conveyor belt, for example. The radiation source(s) 106 is configured to emit fan, cone, wedge, and/or other shaped radiation configurations into the examination region 112 of the object examination apparatus 102. It may be appreciated that such radiation 114 may be emitted substantially continuously and/or may be emitted intermittently (e.g., a short pulse of radiation 114 is emitted followed by a resting period during which the radiation source(s) 106 is not activated).

As the emitted radiation 114 traverses the object(s) 104, the radiation 114 may be attenuated differently by different aspects of the object(s) 104. Because different aspects attenuate different percentages of the radiation 114, an image(s) may be generated based upon the attenuation, or variations in the number of radiation photons that are detected by the detector array 108. For example, more dense aspects of the object(s) 104, such as a bone or metal plate, may attenuate more of the radiation 114 (e.g., causing fewer photons to be detected by the detector array 108) than less dense aspects, such as skin or clothing.

The detector array 108 is configured to directly convert and/or indirectly convert detected radiation into analog signals that can be transmitted from the detector array 108 to a data acquisition component 116 configured to convert analog signals output by the detector array 108 into digital signals and/or to compile signals that were transmitted within a predetermined time interval, or measurement interval, using various techniques (e.g., integration, photon counting, etc.). Such digital signals and/or compiled signals may be referred to as projection data because the data is typically in projection space (e.g., although depending upon the type of radiation system, for example, such data may be in image space)/

In the example environment 100, an image generator 118 is configured to receive the projection data that is output by the data acquisition component 116. Such an image generator 118 may be configured to generate image data from the projection data using a suitable analytical, iterative, and/or other image generation technique (e.g., backprojection reconstruction, tomosynthesis reconstruction, iterative reconstruction, etc.). In this way, the data is converted from projection space to image space, a domain that may be more understandable by a user 124 viewing the image(s), for example. It may be appreciated that in another embodiment, where the data output by the data acquisition component 116 is in image space, a radiation system may not comprise an image generator 118 as provided in the example environment 100, for example.

The example environment 100 also includes a terminal 120, or workstation (e.g., a computer), configured to receive the image(s), which can be displayed on a monitor 122 to a user 124 (e.g., security personnel, medical personnel, etc.). In this way, the user 124 can inspect the image(s) to identify areas of interest within the object(s) 104. The terminal 120 can also be configured to receive user input which can direct operations of the object examination apparatus 102 (e.g., a speed of a conveyor belt, a desired tube current for the radiation source(s) 106, etc.).

In the example environment 100, a controller 126 is operably coupled to the terminal 120. In one example, the controller 126 is configured to receive input from the terminal 120, such as user input for example, and to generate instructions for the object examination apparatus 102 indicative of operations to be performed. For example, the user 124 may desire to reexamine the object(s) 104 at a different energy level, and the controller 126 may issue a command instructing the support article 110 to reverse direction (e.g., bringing the object(s) 104 back into the examination region 112 of the object examination apparatus 102).

It may be appreciated that the example environment 100 merely is intended to describe an example arrangement of an example radiation system, and other arrangements which comprise at least some of the foregoing components and/or which comprise different components are also contemplated. For example, in another embodiment, the radiation system may comprise a threat detection component configured to receive the projection data from the data acquisition component 116 and/or image data from the image generator 118 and to provide (automated) threat analysis based upon the projection data and/or image data. Thus, the scope of the disclosure, including the scope of the claims, is not intended to be limited by the foregoing arrangement of an example radiation system.

Figure 2:
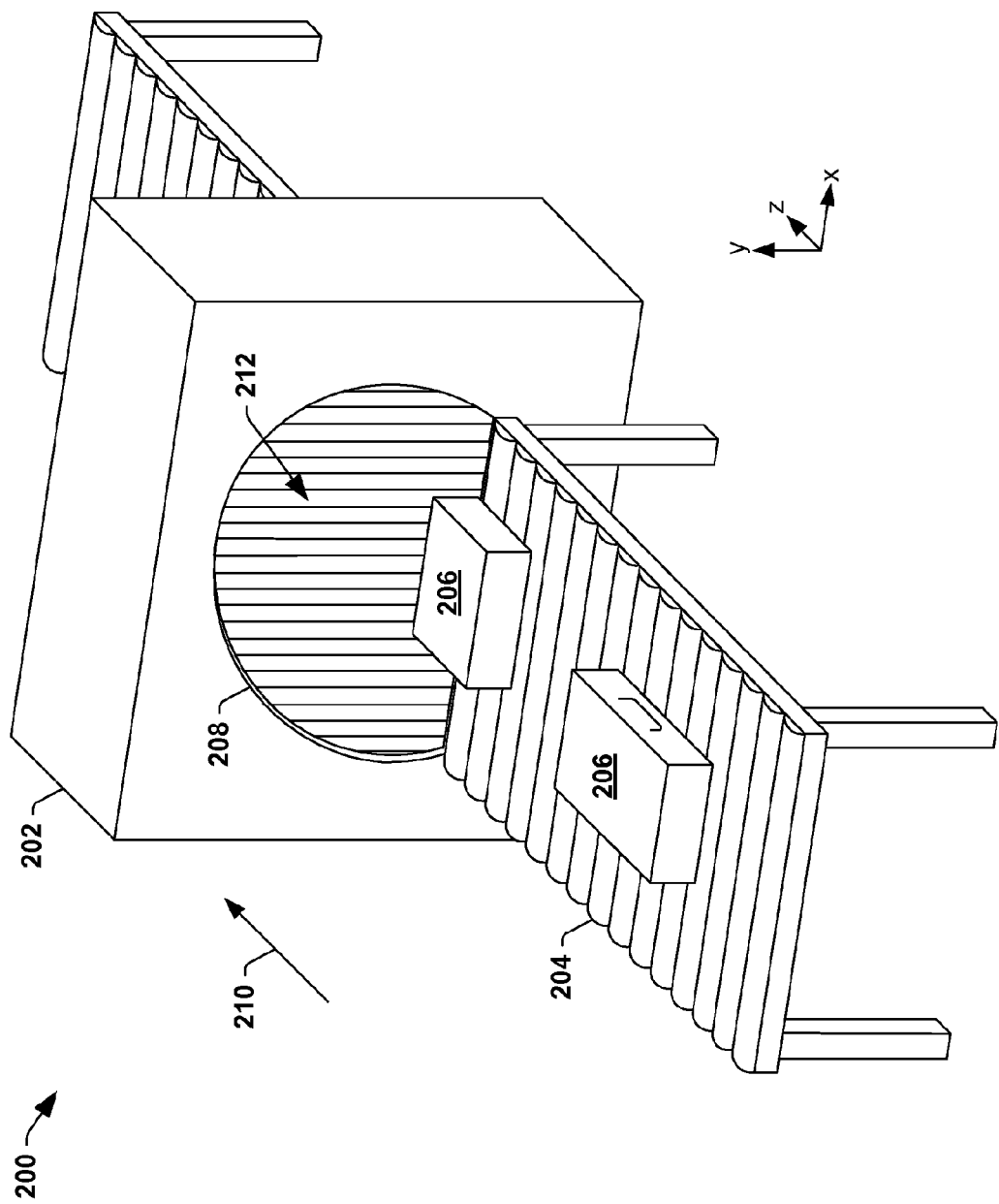
FIG. 2 illustrates an example radiation system comprising an energy shield as described herein.

FIG. 2 illustrates another example environment 200 of a radiation system configured to examine and/or image an object utilizing radiation. More specifically, FIG. 2 illustrates a view of an example radiation system from a position external to the radiation system (e.g., which may be similar to what is observed by security personnel and/or others at a security checkpoint). The radiation system of the example environment 200 is comprised of an examination apparatus (e.g., 102 in FIG. 1) substantially enclosed by a housing 202 (e.g., 109 in FIG. 1) and a support article 204 (e.g., 110 in FIG. 1).

The support article 204 is configured to translate or convey objects 206 through the examination apparatus. By way of example, in the environment 200, the support article 204 comprises a plurality of rollers configured to convey objects 206 through the examination apparatus. Such rollers may be mechanically driven and/or gravity driven, for example. In another embodiment, the support article 204 comprises a conveyor belt onto which objects 206 are placed to be conveyed through the examination apparatus. In still other embodiments, the support article 204 may utilize other techniques and/or apparatuses to convey and/or translate objects 206 through the examination apparatus.

The housing 202 generally defines a first opening 208 (e.g., a bore) via which objects 206 (e.g., 104 in FIG. 1) enter and/or exit the examination apparatus. For example, in the environment 200, the support article 204 may be configured to translate objects 206 through the examination apparatus (e.g., and through the housing 202) in a first direction 210. Thus, objects 206 may enter the housing 202 comprising the examination apparatus via the first opening 208 and may exit the housing via a second opening (not shown) located on an opposite end of the housing 202 relative the first opening 208. It may be appreciated that in some embodiments, the support article 204 may be configured to, at times, reverse the direction of translation (e.g., to re-examine an object), and thus objects may also, at times, exit the housing 202 via the first opening 208, for example.

Within the housing 202 may be comprised the examination apparatus, which may include a radiation source (e.g., 106 in FIG. 1) and a detector array (e.g., 108 in FIG. 1). The radiation source is configured to emit radiation towards an examination region (e.g., 112 of FIG. 1) of the examination apparatus 202, and portions of objects 206 within the examination region are examined/imaged. To reduce an amount of radiation exiting the examination apparatus (e.g., to mitigate radiation leakage), or exiting the housing 202, via openings defined by the housing 202, such as the first opening 208, for example, an energy shield 212 may be physically coupled to the examination apparatus or to the housing 202, and may extended into one of more openings defined by the housing 202, such as the first opening 208. The energy shield 212, which may also be referred to as a curtain, is generally comprised of one or more materials configured to attenuate radiation. For example, the energy shield 212 may by comprised of, but is not limited to, bismuth, barium, lead, tungsten, antimony, copper tin, aluminum, iron, iodine, cadmium, mercury, silver, nickel, zinc, thallium, tantalum, tellurium, and/or uranium. Suitable materials for the energy shield 212 for a specific application may be a function of, among other things, the desired thickness of the energy shield 212 (e.g., measured in a transverse direction parallel to a direction 210 in which the objects 206 are translated), desired weight of the energy shield 212, and/or a permissible radiation leakage tolerance, for example.

The energy shield 212 is comprised of a one or more flaps (e.g., extending in a substantially vertical direction in the example environment 200) which may be separated from one another in a plane via small gaps (e.g., also extending in a substantially vertical direction). Such flaps are configured for movement upon contact by an object 206 to facilitate entry into the examination apparatus and/or to facilitate an exit from the examination apparatus, for example.

As may be described in more detail below, one or more of the flaps may respectively define an aperture which provides a demarcation between two or more flap segments of respective flaps. Such an aperture may be, among other things, a notch in the flap or a slit through that flap, for example, and provides for movement of a second flap segment of the flap relative to a first flap segment of the flap. As an example, a notch or relief may be cut into the one or more flaps (e.g., or may be incorporated into a die from which the energy shield 212 is manufactured) to facilitate (e.g., substantially independent) movement of a second flap segment of a flap relative to a first flap segment of the flap. In this way, an object 206 contacting merely the second flap segment of the flap (e.g., and not the first flap segment) may encounter resistance primarily from the second flap segment (e.g., as opposed to the entire flap), for example. As such, an amount of force necessary for the object 206 to traverse the flap (e.g., to gain entry into the examination apparatus 202 and/or to exit the examination apparatus 202) may be less than would be required if the flap were not segmented, for example.

FIG. 3 illustrates an example flap 300 of an energy shield (e.g., 212 in FIG. 2) which may be utilized to mitigate radiation leakage through an opening (e.g., 208 in FIG. 2) in a housing (e.g., 202 in FIG. 2) of an examination apparatus configured to examine/image objects.

The flap 300 may comprise a longitudinal component 302 measured in a longitudinal direction (e.g., y-direction), a latitudinal component 304 measured in a latitudinal direction (e.g., x-direction), and a transverse component 306 measured in a transverse direction (e.g., z-direction). The transverse direction is typically parallel to a direction in which an object(s) is translated (e.g., 210 in FIG. 2). The latitudinal direction is perpendicular to the transverse direction and is typically parallel to a surface of a support article (e.g., 204 in FIG. 2) upon which objects are placed. The longitudinal direction is typically perpendicular to both the transverse direction and the latitudinal direction (e.g., and in a typical scanning environment is substantially vertical).

With respect to the example flap 300, the longitudinal component 302 of the flap defines a length of the flap 300 and is measured from a top surface 308 of the flap 300 to a bottom surface 310 of the flap 300. The latitudinal component 304 of the flap 300 defines a width of the flap 300 and is measured from a first edge 312 of the flap 300 to a second edge 314 of the flap 300. The transverse component 306 of the flap 300 defines a thickness of the flap 300 and is measured from a first face 316 of the flap 300 to a second face 318 of the flap 300.

Typically, the length of the flap 300 is a function of a size of the opening the flap 300 is intended to traverse. It may be appreciated that in some embodiments, such as where the opening is circular (e.g., as illustrated in FIG. 2), some flaps of an energy shield may have a greater length than other flaps (e.g., some flaps may be longer than others). The width and/or thickness of the flap 300 may be a function of, among other things, a degree of radiation leakage that is permissible and/or the size of objects traversing the opening. For example, thicker and/or wider flaps may reduce radiation leakage relative to thinner and/or less wide flaps, but may hamper the movement of small objects traversing the opening. As such, the thickness and/or width of the flaps may be sized to balance radiation leakage considerations with object size considerations, for example. It may be appreciated that the foregoing description of the flap 300 may also apply to one or more figures proceeding FIG. 3, which describe other embodiments of example flaps.

The example flap 300 defines an aperture 320 (e.g., a notch, channel, etc.) that provides a demarcation between a first flap segment 322 of the flap 300 and a second flap segment 324 of the flap 300. In the example embodiment, the aperture 320 substantially extends in the transverse direction (e.g., z-direction) from the first face 316 of the flap 300 toward the second face 318 of the flap 300, but does not extend through the flap 300 from the first face 316 to the second face 318. That is, a transverse component of the aperture 300 may be less than the transverse component 306 of the flap 300, for example. In this way, the first flap segment 322 remains physically coupled to (e.g., fused to) the second flap segment 324 proximate the second face 318 such that the aperture 320 may not be evident if that flap 300 is viewed from a perspective depicting merely the second face 318, for example.

In the illustrated embodiment, a latitudinal component of the aperture 320 is substantially equal to the latitudinal component 304 of the flap 300 and thus the aperture 320 extends from the first edge 312 of the flap 300 to the second edge 314 of the flap. In another embodiment, the latitudinal component of the aperture 320 may be less than the latitudinal component 304 of the flap 300 (e.g., although such a configuration may provide a degree of resistance with regard to the independent movement by the second flap segment 324 relative to the first flap segment 322).

It may be appreciated that in the illustrated embodiment, a cross-section of the aperture 320 (e.g., illustrating the transverse and longitudinal components of the aperture 320) may illustrates a substantially v-shaped aperture (e.g., rotated 90 degrees counterclockwise). In other embodiments, the aperture 320 may appear to be shaped differently. For example, in another embodiment, a flap may define a substantially sideways u-shaped aperture, a substantially w-shaped aperture, a rectangular shaped aperture, etc.

The aperture 320 provides for movement of the second flap segment 324 relative to the first flap segment 322. That is, stated different, the aperture 320 provides a flex region within the flap 300 that facilitates substantially independent movement of the second flap segment 324 relative to the first flap segment 322. For example, when an object contacts the second flap segment 324 (e.g., but not the first flap segment 322), the aperture 320 may facilitate the second flap segment 324 moving (e.g., pivoting, hinging, etc.) relative to the first flap segment 322.

In the example embodiment, the flap 300 may comprise a flexible member 326 that is spatially proximate the aperture 320 and adjacent (e.g., located on) a face of the flap 300 that is opposite a face of the flap that in-part defines the aperture 320. For example, in the illustrated embodiment, the aperture 320 extends from the first face 316 toward the second face 318. As such, the first face 316 in-part defines the aperture 320, and the flexible member 326 may be adjacent the second face 318, which is on an opposite side of the flap 300 relative to the first face 316.

The flexible member 326 may be configured to reinforce the flap at a location spatially proximate the aperture 320 (e.g., given that a thickness of the flap 300 as measured proximate the aperture 320 is less than a thickness of the flap 300 as measured in other areas not defining the aperture 320) and/or may be configured to provide for (e.g., facilitate) movement of the second flap segment 324 relative to the first flap segment 322.

The flexible member 326 is typically comprised of a different composition than the flap segment. For example, at least one of the first flap segment 322 or the second flap segment 324 may comprise lead and the flexible member 326 may not comprise lead. Instead, the flexible member 326 may comprise, among other things, a fiber reinforced tape or other flexible adhesive material, a mechanical hinge, Teflon, and/or other materials which bend or flex when a force is applied to a surface of the material. The flexible member 326 may be transparent to radiation, may be partially opaque to radiation, and/or may be fully opaque to radiation (e.g., such that radiation imaging the flexible member 416 may be substantially blocked from traversing the flexible member 416) depending upon the composition of the flexible member 326.

Moreover, the flexible member 326 may be applied to the flap 300 via an adhesive, mechanical fasteners (e.g., screws, rivets, nails, etc.), and/or other bonding, securing, etc. techniques, for example.

A latitudinal component of the flexible member 326 may be substantially equal to the latitudinal component 304 of the flap 300 and/or may be different than (e.g., less than) the latitudinal component 304 of the flap. Further, a longitudinal component of the flexible member 326 may be substantially equal to a longitudinal component of the aperture 320 and/or may be different than (e.g., greater than or less than) the longitudinal component of the aperture 320.

FIG. 4 illustrates another embodiment of an example flap 400 of an energy shield (e.g., 212 in FIG. 2) which may be utilized to mitigate radiation leakage through an opening (e.g., 208 in FIG. 2) in a housing (e.g., 202 in FIG. 2) of an examination apparatus configured to examine/image objects. It may be appreciated that dimensional components of the flap 400 may be similar in orientation and/or size to the dimensional components (e.g., longitudinal component, latitudinal component, and/or transverse component) of the example flap 300 in FIG. 3, and thus for purposes of brevity, for example, are not re-described with respect to FIG. 4.

The example flap 400 defines an aperture 402 (e.g., e.g., 320 in FIG. 3) that provides a demarcation between a first flap segment 404 (e.g., 322 in FIG. 3) of the flap 400 and a second flap segment 406 (e.g., 324 in FIG. 3) of the flap 400. In the example embodiment, the aperture 402 extends through the first flap 400 (e.g., in the transverse direction) from a first face 408 (e.g., 316 in FIG. 3) of the flap 400 to a second face 410 (e.g., 318 in FIG. 3) of the flap 400. That is, stated differently, the aperture 402 is a slice (e.g., or gap) between the first flap segment 404 and the second flap segment 406, where a transverse component of the aperture 402 is substantially equal to a transverse component of the flap 400, for example. In this way, the first flap segment 404 is physically detached from the second flap segment 406 such that the aperture 402 may be visible if the flap 400 is viewed from a perspective depicting the second face 410 and may be visible if the flap 400 is viewed from a perspective depicting the first face 408, for example.

In the illustrated embodiment, a latitudinal component of the aperture 402 is substantially equal to a latitudinal component 402 of the flap 400 and thus the aperture 402 extends from a first edge 412 (e.g., 312 in FIG. 3) of the flap 400 to a second edge 414 (e.g., 314 in FIG. 3) of the flap 400. In another embodiment, the latitudinal component of the aperture 402 may be less than the latitudinal component of the flap 400, for example.

A flexible member 416 (e.g., 326 in FIG. 3) of the flap 400 may be located spatially proximate the aperture 402 and adjacent one or more faces of the flap 400, such as the second face 410. As illustrated, the flexible member 416 may be coupled to the first flap segment 404 and the second flap segment 406 and may extend across the aperture 402. In this way, the flexible member 416 is configured to physically couple the first flap segment 404 with the second flap segment 406, for example.

The flexible member 416 may also be configured to provide for movement (e.g., pivoting, hinging, etc.) of the second flap segment 406 relative to the first flap segment 404. That is, stated differently, the flexible member 416 may be configured to behave as a pivot point about which the second flap segment 406 may pivot relative to the first flap segment 404, for example.

FIGS. 5-6 illustrate how the aperture 402 and/or flexible member 416 may provide for (e.g., facilitate) movement of the second flap segment 406 of the flap 400 relative to the first flap segment 404 when a force (e.g., of an object 422) is applied to the second flap segment 406 (e.g., but not the first flap segment 404). As illustrated in FIG. 5, when an object 422 (e.g., 206 in FIG. 2) begins to apply force to the second flap segment 406, the second flap segment 406 may start to pivot at the aperture 402 along a pivot axis while the first flap segment 404 remains substantially stationary (e.g., relative to the position of the second flap segment 406 and the position of the first flap segment 404 in FIG. 4 when no force was applied to the flap 400). Thus, a first sidewall 418 of the first flap segment 404 becomes non-planar with a first sidewall 420 of the second flap segment 406. In contrast, in FIG. 4, the first sidewall 418 of the first flap segment 404 and the first sidewall 420 of the second flap segment 406 are substantially planar (e.g., to form a planar first face 408 of the flap 400).

As illustrated in FIG. 6, as an object 422 continues to contact the second flap segment 406, the second flap segment 406 may continue to move or pivot relative to the first flap segment 404, until the object 422 is no longer applying a force to the second flap segment 406 and/or until the object is able to pass by the flap 400. After the object passes by the flap 400, the second flap segment 406 may return to an initial position before a force was applied by an object (e.g., as illustrated in FIG. 4) (e.g., via gravity and/or via a tensioning assembly, such as a spring located in the flexible member 416, for example).

It may be appreciated that while FIGS. 3-6 illustrate example embodiments of a flap defining a single aperture which provides a demarcation for separating a flap into two segments, a number of apertures defined by a flap of an energy shield may be more than one and/or the flap may be separated into more than 2 segments. By way of example, FIG. 7 illustrates an example flap 700 defining two apertures 702, 712. Again, it may be appreciated that dimensional components of the flap 700 may be similar in orientation and/or size to the dimensional components (e.g., longitudinal component, latitudinal component, and/or transverse component) of the example flap 300 in FIG. 3, and thus for purposes of brevity, for example, are not re-described with respect to FIG. 7.

A first aperture 702 defined by the flap 700 (e.g., 320 in FIG. 3) extends from a second face 704 (e.g., 318 in FIG. 3) of the flap 700 towards a first face 706 (e.g., 316 in FIG. 3) and provides a first demarcation between a first flap segment 708 (e.g., 322 in FIG. 3) and a second flap segment 710 (e.g., 324 in FIG. 3). A second aperture 712 defined by the flap 700 extends from the first face 706 toward the second face 704 and provides for a second demarcation between the second flap segment 710 and a third flap segment 714. In the example embodiment, a longitudinal component of the first flap segment 708 is not equal to a longitudinal component of the second flap segment 710 and/or to a longitudinal component of the third flap segment 714. Moreover, the longitudinal component of the third flap segment 714 is not equal to the longitudinal component of the second flap segment 710. Thus, the longitudinal component of respective flap segments is different. In another embodiment, the longitudinal component of one or more flap segments of a flap may be the same or substantially equal, for example.

In the example embodiment, the first aperture 702 and the second aperture 712 do not extend through the flap 700, but rather form notches, grooves, etc. in the flap 700. Thus, the first flap segment 708, the second flap segment 710, and the third flap segment 714 remain at least partially physically connected. In another embodiment, at least one of the apertures 702, 712 may extend through the flap 700 from the first face 706 to the second face 704 such that one or more segments of the flap 700 are physically detached from one or more other segments of the flap 700 (e.g., such as illustrated in FIG. 4).

Respective apertures 702, 712 provide for movement of one or more segments relative to other segments. For example, the first aperture 702 may provide for movement (e.g., pivoting) of the second flap segment 710 relative to the first flap segment 708, and the second aperture 712 may provide for movement of the third flap segment 714 relative to the second flap segment 710. In this way, respective segments of the flap 700 may move substantially independent of at least some of the other segments of the flap 700.

The flap 700 may comprise one or more flexible members respectively configured to at least one of reinforce a portion of the flap 700 spatially proximate an aperture and/or provide for movement of a segment of the flap relative to one or more other segments of the flap 700. By way of example, in the illustrated embodiment, a first flexible member 716 is positioned adjacent the first face 706 and spatially proximate the first aperture 702, and a second flexible member 718 is positioned adjacent the second face 704 and spatially proximate the second aperture 712.

It may be appreciated that the placement of a flexible member and/or the direction of the aperture (e.g., towards the first face 706 and/or towards the second face 704) may control and/or limit movement of the segments. For example, in the illustrated embodiment, the first aperture 702 extends toward the first face 706 and the first flexible member 716 is positioned adjacent the first face 706. As such, the first aperture 702 and/or first flexible member 716 may provide for movement of the second flap segment 710 in a first direction (e.g., allowing the second flap segment 710 to pivot to the left on the page) relative to the first flap segment 708 (e.g., while mitigating movement of the second flap segment 710 relative to the first flap segment 708 in a second direction (e.g., to the right on the page)) (e.g., relative to an initial position where the sidewalls of the flap segments are substantially planar to one another). Conversely, in the illustrated embodiment, the second aperture 712 extends toward the second face 704 and the second flexible member 718 is positioned adjacent the second face 704. As such, the second aperture 712 and/or second flexible member 718 may provide for movement of the third flap segment 714 in the second direction (e.g., allowing the third flap segment 714 to pivot to the right on the page) relative to the second flap segment 710 (e.g., while mitigating movement of the third flap segment 714 relative to the second flap segment 710 in the first direction (e.g., to the left on the page) (e.g., relative to an initial position where the sidewalls of the flap segments are substantially planar to one another). In this way, respective apertures and/or flexible members provide for movement of a flap segment substantially in one direction (e.g., relative to an initial starting orientation). In another embodiment, the apertures and/or flexible members may provide for bi-direction movement of a flap segment relative to another one or more flap segments of the flap, for example.

It may be appreciated that in FIGS. 3-7, the aperture is shown as extending into/through the flap in the transverse direction. In another embodiment, the aperture may extend in a direction that is not parallel to the transverse direction (e.g., z-direction). By way of example, FIG. 8 illustrates an example flap 800 comprising an aperture 802 that extends through the flap 800 in a direction that is not parallel to the transverse direction. More particularly, where the aperture 802 extends through the flap 800, a first end 804 of a first flap segment 806 abuts a first sidewall 808 of the first flap segment 806 at a first angle 810 other than 90 degrees. Similarly, a first end 812 of a second flap segment 814 (e.g., adjacent the first end 804 of the first flap segment 806) abuts a first sidewall 816 of the second flap segment 814 (e.g., along a same face of the flap 800 as the first sidewall 808 of the first flap segment 806) at a second angle 818 other than 90 degrees. In one embodiment, the first angle 810 and the second angle 818 are substantially supplementary angles. In this way, a plane extending through the aperture is not parallel to a plane formed by the transverse direction and latitudinal direction and/or is not parallel to a plane of a surface (e.g., of a support article 204 in FIG. 2) upon which an object undergoing examination is placed, for example. As such, radiation leakage through the aperture 802 may be less than if the aperture 802 extended through the flap 800 in a direction that is parallel to the transverse direction, for example.

FIGS. 9 and 10 illustrate example energy shields respectively comprised of a plurality of flaps. It may be appreciated that the flaps are shaded in alternating patterns to assist in distinguishing respective flaps of the energy shield. Such an alternating pattern is not intended to be limiting, such as to imply that a first set of every other flap is different in composition and/or function from a second set of every other flap, for example.

With respect to FIG. 9, an energy shield 900 comprised of a single layer of flaps 902 is provided. Respective flaps of the energy shield 900 define two apertures 904 and comprise two flexible members 906 respectively spatially proximate an aperture 904. The apertures 904 are staggered in a longitudinal direction (e.g., the y-direction). For example, apertures defined by respective flaps of a first set of flaps (e.g., the lighter shaded flaps) are positioned at a different longitudinal coordinate (measured from a bottom of the flap towards a top of the flap (e.g., from the bottom of the page toward the top of the page)) than apertures defined by respective flaps of a second set of flaps (e.g., the darker shaded flaps). Thus, at least one flap segment of respective flaps of the first set may have a different longitudinal coordinate than a corresponding at least one flap segment of respective flaps of the second set, for example. As such, within a layer of flaps 902, some apertures 904 may be located as a different longitudinal coordinate than other flaps.

With respect to FIG. 10, an energy shield 1000 comprising a plurality of layers 1002*a-d* of flaps 1004 is provided. As illustrated one or more apertures 1006 defined by flaps 1004 in a first layer 1002*a* may be located at a different longitudinal coordinate than one or more apertures 1006 defined by flaps 1004 in a second layer 1002*b*, for example (e.g., where a longitudinal coordinate of an aperture is measured from a bottom of the flap towards a top of the flap (e.g., from the bottom of the page toward the top of the page)). Further, as illustrated in FIG. 10, a number of apertures 1006 defined by flaps 1004 of the first layer 1002*a* may be different than a number of apertures 1006 defined by flaps 1004 of a second layer 1002. For example, the flaps of the first layer 1002*a* (e.g., and/or the third layer 1002*c*) may respectively comprise two apertures, whereas the flaps of the second layer 1002*b* (e.g., and/or the fourth layer 1002*d*) may respectively comprise one aperture.

It may be appreciated that the example arrangements of flaps in an energy shield are merely example illustrations and are not intended to limit the scope of the disclosure, including the scope of the claims. For example, in another embodiment, the number of apertures defined by a first flap of a first layer may be different than a number of flaps defined by a second flap of the first layer. For example, some flaps of the first layer may define zero apertures while other flaps of the first layer define one or more apertures. Also, as illustrated in FIG. 9, a longitudinal coordinate of an aperture of a flap in a layer (e.g., 1002*a*) may differ from a longitudinal coordinate of an aperture of a different flap in that layer. As yet another example, a longitudinal coordinate of apertures defined by flaps in a first layer may be substantially equal to a longitudinal coordinate of apertures defined by flaps in a second layer, for example. That is, coordinates of apertures may be varied across flaps within a layer and/or among layers in virtually any manner, such as to mitigate radiation leakage in a desired manner, for example. Similarly, any one or more of such apertures may be configured in desired (e.g., different) manner(s) (e.g., as illustrated and described with respect FIGS. 3-8) and/or may be configured to facilitate movement in desired (e.g., different) manner(s) and/or direction(s) as illustrated and described with respect to FIGS. 3-8), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. An apparatus, comprising:
   an energy shield configured to mitigate radiation leakage from a radiation system and comprising one or more flaps, wherein:
   a first flap of the one or more flaps defines a first aperture extending from a first face of the first flap towards a second face of the first flap diametrically opposite the first face of the first flap,
   the first aperture provides a first demarcation between a first flap segment of the first flap and a second flap segment of the first flap,
   the first flap segment is integral with the second flap segment near the second face of the first flap, and
   the first aperture provides for movement of the second flap segment relative to the first flap segment.

2. The apparatus of claim 1, wherein:
   the first flap comprises a flexible member disposed at the second face of the first flap and extending between the first flap segment and the second flap segment, and
   the flexible member is configured to reinforce the first flap at a location spatially proximate the first aperture.

3. The apparatus of claim 2, wherein the flexible member comprises a flexible adhesive material.

4. The apparatus of claim 2, wherein the flexible member comprises a fiber reinforced tape.

5. The apparatus of claim 2, wherein the flexible member comprises a mechanical hinge.

6. The apparatus of claim 1, wherein the first aperture is v-shaped.

7. The apparatus of claim 1, wherein:
   the first flap defines a second aperture,
   the second aperture provides a second demarcation between the second flap segment of the first flap and a third flap segment of the first flap, and
   the second aperture provides for movement of the third flap segment relative to the second flap segment.

8. The apparatus of claim 7, wherein the second aperture extends from the second face of the first flap towards the first face of the first flap.

9. The apparatus of claim 8, wherein the first flap comprises:
   a first flexible member adjacent the second face of the first flap and spatially proximate the first aperture, and
   a second flexible member adjacent the first face of the first flap and spatially proximate the second aperture.

10. The apparatus of claim 7, wherein the second aperture provides for movement of the third flap segment in a first direction and the first aperture provides for movement of the second flap segment in a second direction different than the first direction.

11. The apparatus of claim 2, wherein a material composition of the first flap is different than a material composition of the flexible member.

12. An apparatus, comprising:
an energy shield configured to mitigate radiation leakage from a radiation system and comprising one or more flaps, wherein:
- a first flap of the one or more flaps defines a first aperture extending from a first face of the first flap towards a second face of the first flap diametrically opposite the first face of the first flap,
- the first aperture provides a first demarcation between a first flap segment of the first flap and a second flap segment of the first flap,
- the first aperture does not extend to the second face of the first flap such that the first flap segment is integral with the second flap segment near the second face of the first flap, and
- the first flap comprises a flexible member configured to physically couple the first flap segment to the second flap segment.

13. The apparatus of claim 12, wherein the flexible member comprises at least one of a flexible adhesive material or a mechanic hinge.

14. The apparatus of claim 12, wherein:
- the first flap defines a second aperture extending from the second face of the first flap towards the first face of the first flap,
- the second aperture provides a second demarcation between the second flap segment of the first flap and a third flap segment of the first flap, and
- the second aperture does not extend to the first face of the first flap such that the second flap segment is integral with the third flap segment near the first face of the first flap.

15. A radiation system, comprising:
a radiation source;
a detector array;
an examination region through which radiation passes; and
an energy shield configured to mitigate radiation leakage from the examination region through an opening in the radiation system through which an object is conveyed at least one of into or out of the examination region, wherein:
the energy shield is positioned within the opening and comprises one or more flaps,
a first flap of the one or more flaps defines a first aperture extending from a first face of the first flap towards a second face of the first flap diametrically opposite the first face of the first flap,
the first aperture provides a first demarcation between a first flap segment of the first flap and a second flap segment of the first flap, and
the first flap segment is integral with the second flap segment near the second face of the first flap.

16. The radiation system of claim 15, wherein the first flap comprises a flexible material configured to reinforce the first flap at a location spatially proximate the first aperture.

17. The radiation system of claim 16, wherein the flexible material comprises a different material composition than at least one of the first flap segment or the second flap segment.

18. The radiation system of claim 15, wherein the radiation source comprises an ionizing radiation source.

19. The apparatus of claim 8, wherein the second flap segment is integral with the third flap segment near the first face of the first flap.

20. The radiation system of claim 15, the first flap defines a second aperture extending from the second face of the first flap towards the first face of the first flap,
the second aperture provides a second demarcation between the second flap segment of the first flap and a third flap segment of the first flap, and
the second aperture does not extend to the first face of the first flap such that the second flap segment is integral with the third flap segment near the first face of the first flap.

* * * * *